(12) United States Patent
Decrop et al.

(10) Patent No.: US 11,665,316 B2
(45) Date of Patent: May 30, 2023

(54) OBFUSCATION DURING VIDEO CONFERENCING

(71) Applicant: INTERNATIONAL BUSINESS MACHINES CORPORATION, Armonk, NY (US)

(72) Inventors: Clement Decrop, Arlington, VA (US); Lisa Seacat DeLuca, Bozeman, MT (US); Zachary A. Silverstein, Georgetown, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/453,511

(22) Filed: Nov. 4, 2021

(65) Prior Publication Data
US 2023/0135312 A1 May 4, 2023

(51) Int. Cl.
| | | |
|---|---|---|
| *H04N 7/15* | (2006.01) | |
| *G06T 5/00* | (2006.01) | |
| *G06F 3/16* | (2006.01) | |
| *G01S 17/88* | (2006.01) | |
| *G06V 10/40* | (2022.01) | |
| *G06V 20/40* | (2022.01) | |
| *G06V 40/10* | (2022.01) | |

(52) U.S. Cl.
CPC ............. *H04N 7/15* (2013.01); *G01S 17/88* (2013.01); *G06F 3/165* (2013.01); *G06T 5/002* (2013.01); *G06V 10/40* (2022.01); *G06V 20/41* (2022.01); *G06V 40/10* (2022.01); *G06T 2207/10016* (2013.01); *G06T 2207/30201* (2013.01)

(58) Field of Classification Search
CPC .... H04N 7/15; G06T 5/00; G06F 3/16; G01S 17/88; G06K 9/00; G06K 9/46
USPC ............................................. 348/14.01–14.16
See application file for complete search history.

(56) References Cited

U.S. PATENT DOCUMENTS

| | | | |
|---|---|---|---|
| 8,749,610 B1 * | 6/2014 | Gossweiler | H04L 12/1827 |
| | | | 348/14.09 |
| 9,189,143 B2 | 11/2015 | Jones | |
| 10,032,066 B2 | 7/2018 | Gongaware | |
| 10,091,199 B2 | 10/2018 | Copsey | |
| 10,893,329 B1 | 1/2021 | Trim | |
| 10,931,676 B2 | 2/2021 | Pantazelos | |
| 10,931,918 B1 | 2/2021 | Griffin | |
| 11,165,755 B1 * | 11/2021 | Qian | H04N 5/272 |

(Continued)

FOREIGN PATENT DOCUMENTS

WO    WO-2021257881 A1 * 12/2021

OTHER PUBLICATIONS

Author Unknown, "Security Features," TurboBridge, Accessed: Aug. 19, 2021, https://turbobridge.com/security.html, 4 pages.

(Continued)

*Primary Examiner* — Melur Ramakrishnaiah
(74) *Attorney, Agent, or Firm* — Daniel J Blabolil (57) ABSTRACT

The present invention may include a computer that intercepts a video stream. The computer determines user preferences associated with the user based on identifying the user using an optical instrument. The computer identifies one or more faces from the video stream of the video conference and obfuscates the video stream based on the user preferences associated with the one or more faces.

20 Claims, 6 Drawing Sheets

(56) References Cited

U.S. PATENT DOCUMENTS

| | | | | |
|---|---|---|---|---|
| 2011/0063440 | A1* | 3/2011 | Neustaedter | H04N 7/147 |
| | | | | 348/143 |
| 2017/0187966 | A1* | 6/2017 | Oetting | H04N 7/15 |
| 2017/0374194 | A1* | 12/2017 | Sales | H04W 4/02 |
| 2018/0343294 | A1* | 11/2018 | Rands | G06Q 30/02 |
| 2020/0249816 | A1* | 8/2020 | Liu | G06T 19/006 |
| 2022/0210341 | A1* | 6/2022 | Hwang | H04N 5/23229 |

OTHER PUBLICATIONS

Disclosed Anonymously, "A More Humanized and Intelligent Video Conference System based on Face Recognition," IP.com, IP.com No. IPCOM000254157D, IP.com Publication Date: Jun. 5, 2018, 7 pages.

Disclosed Anonymously, "Dynamic Video Conferencing Smart Audio State Management," IP.com, IP.com No. IPCOM000265125D, IP.com Publication Date: Mar. 1, 2021, 5 pages.

Disclosed Anonymously, Face Movement Tracing and Rebuilding for Reduced Data Transmission in Video Conferences, IP.com, IP.com No. IPCOM000263252D, IP.com Publication Date: Aug. 12, 2020, 7 pages.

Glassenberg et al., "Assisted Media Filtering," Computer Science 223B Computer Vision, Mar. 12, 2004, http://robots.stanford.edu/cs223b04/project_reports/P19.pdf, 22 pages.

Lu et al., "Recent Progress of Face Image Synthesis," arXiv:1706.04717v1 [cs.CV] Jun. 15, 2017, http://arxiv-export-lb.library.cornell.edu/pdf/1706.04717, 17 pages.

Mell et al., "The NIST Definition of Cloud Computing", National Institute of Standards and Technology, Special Publication 800-145, Sep. 2011, 7 pages.

Tinsley et al., "The Face Does Not Exist . . . but it May be Yours! Identity Leakage in Generative Models," arXiv:2101.05084v1 [cs.CV] Dec. 10, 2020, https://arxiv.org/pdf/2101.05084v1.pdf, 11 pages.

Wadhwani et al., "Video Conferencing Market Size By Component (Hardware [Multipoint Control Unit (MCU), Codecs, Peripheral Devices], Software [On-premise, Cloud], Service [Professional, Managed]), By Type (Room-Based, Telepresence, Desktop), By Application (Corporate Enterprise, Education, Government, Healthcare), COVID-19 Impact Analysis, Regional Outlook, Growth Potential, Competitive Market Share & Forecast, 2020-2026," Global Market Insights, Published May 2020, 10 pages.

Wadhwani et al., "Video Conferencing Market worth over $50bn by 2026," Global Market Insights, Aug. 3, 2021, https://www.gminsights.com/pressrelease/video-conferencing-market, 6 pages.

\* cited by examiner

OBFUSCATION DURING VIDEO CONFERENCING

BACKGROUND

The present invention relates, generally, to the field of computing, and more particularly to utilizing facial recognition for video obfuscation during video conferencing.

Video conferencing typically refers to technologies for the reception and transmission of video and or audio signals by users in different locations, for communication between people in real time. Video conferencing implies the use of this technology for one or more users, in a video conference. One of the users may be a machine learning algorithm or other artificial intelligence (AI) module that is capable of natural language or video processing.

Obfuscation of video content, also known as fogging or blurring is a form of editing of a video content that obscures from sight a visual area of a video for privacy purposes. Typically, video obfuscation is performed using pixelization, that displays part or all of a video at a markedly lower resolution.

SUMMARY

According to one embodiment, a method, computer system, and computer program product for video obfuscation in a video conference is provided. The present invention may include a computer that intercepts a video stream. The computer determines user preferences associated with the face based on identifying the user using an optical instrument. The computer identifies one or more faces from the video stream of the video conference and obfuscates the video stream based on the user preferences associated with the one or more faces.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to utilizing facial recognition for video obfuscation during video conferencing. The following described exemplary embodiments provide a system, method, and program product to, among other things, protecting users privacy during video conferencing. Therefore, the present embodiment has the capacity to improve the technical field of video conferencing security by obscuring from sight a visual area of a video of a user that was not authenticated for privacy purposes.

As previously described, video conferencing typically refers to technologies for the reception and transmission of video and audio signals by users in different locations, for communication between people in real time. Video conferencing implies the use of this technology for one or more users, in a video conference. One of the users may be a machine learning algorithm or other artificial intelligence (AI) module that is capable of natural language and image processing.

A video conference, such as video chat may include many individuals from various devices where some of the participants are unknown to the user. Thus, a privacy of a user may be violated because an unknown or unwanted participant may capture the face of a user without the user's consent. Alternatively, a camera may capture several faces that are not part of the video conference call and would like to keep their faces private. For example, in many daycare centers there are video cameras that are constantly streaming over the internet and allow parents to watch over their children. However, a person, such as a workman, may be captured by the camera. Furthermore, an unwanted participant may stream offensive content that may insult or affect the user without user's prior authorization. As such, it may be advantageous to, among other things, implement a system that enables a person to enroll in a service that identifies faces of other participants and determines relevance of the participant to the user and, based on user preferences related to the relevance of the participants to the user, obfuscates the video stream either partially or completely.

According to one embodiment, a video conference obfuscation program may extract user facial features and store them in a database upon successful completion of an opt-in process. The program then identifies all of the contacts related to the user using a social network or employee registry database and requests preferences of obfuscation from the user via a graphical user interface (GUI) of the video conference obfuscation program. Then, when any video conference is initiated, the video conference obfuscation program may identify participants using facial recognition and, based on the preferences obfuscate, a video stream by hiding the user's face, the unknown or unwanted participants, and/or blocking, either partially or completely, the video stream.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to obfuscate a video stream during video conference based on user privacy settings.

Figure 1:
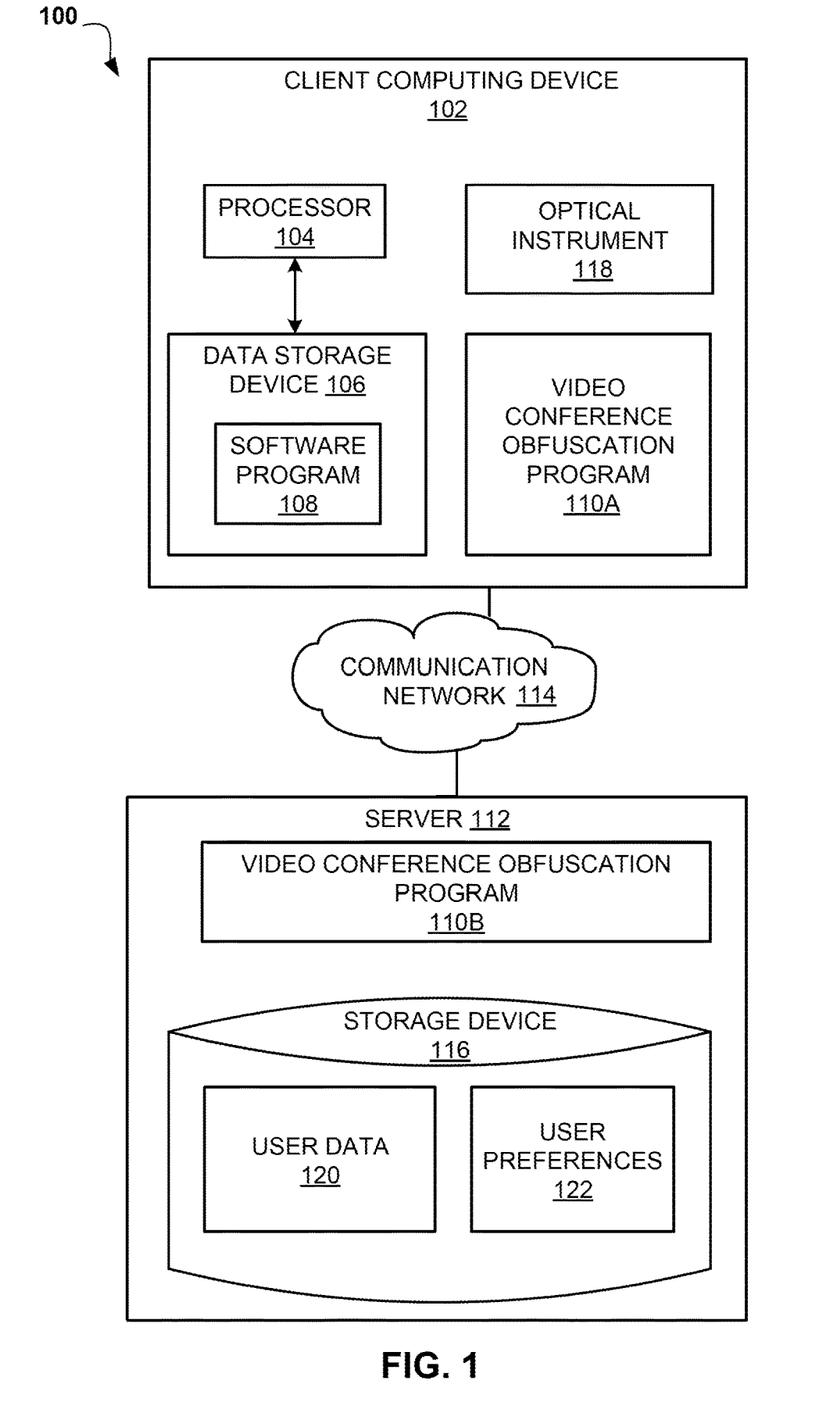
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wired communication links, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104, an optical instrument 118 and a data storage device 106 that is enabled to host and run a software program 108 and a video conference obfuscation (VCO) program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. The optical instrument 118 may be a thermal, shape or video capturing device that is integrated into or communicatively-coupled with client computing device 102 or communicating with the client computing device 102 via communication network 114, such as a LIDAR sensor, a surveillance camera or a thermal camera. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a video conference obfuscation (VCO) program 110B and a storage device 116 that stores user data 120 and user preferences 122. The server computer 112 is capable of communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud. The user data may be a database or a record that is capable of storing data of each of the users that may include photos of a user, user identification information, vectorized representation of a face of the user for user recognition, vectorized representation of a voice of the user, records of friends and coworkers of the user and pointers to their user profiles. The user preferences 122 may be a database or group of records that include user identifications and associate each user preference related to obfuscation of a video stream, such as whether a user wants to blur his face in case an unregistered user participates in a video conference, whether underage faces when captured by the camera should be blurred etc.

According to the present embodiment, the video conference obfuscation (VCO) program 110A, 110B may be a program capable of extracting user facial feature upon enrollment with the services. Then the VCO program 110A, 110B may extract contacts that have a relationship with the user from various databases and, based on the settings and user preferences, obfuscate the video stream, such as blurring the face of the user, in order to maintain user privacy or block a video stream to or from the unwanted participant. The video conference obfuscation method is explained in further detail below with respect to FIG. 2.

Figure 2:
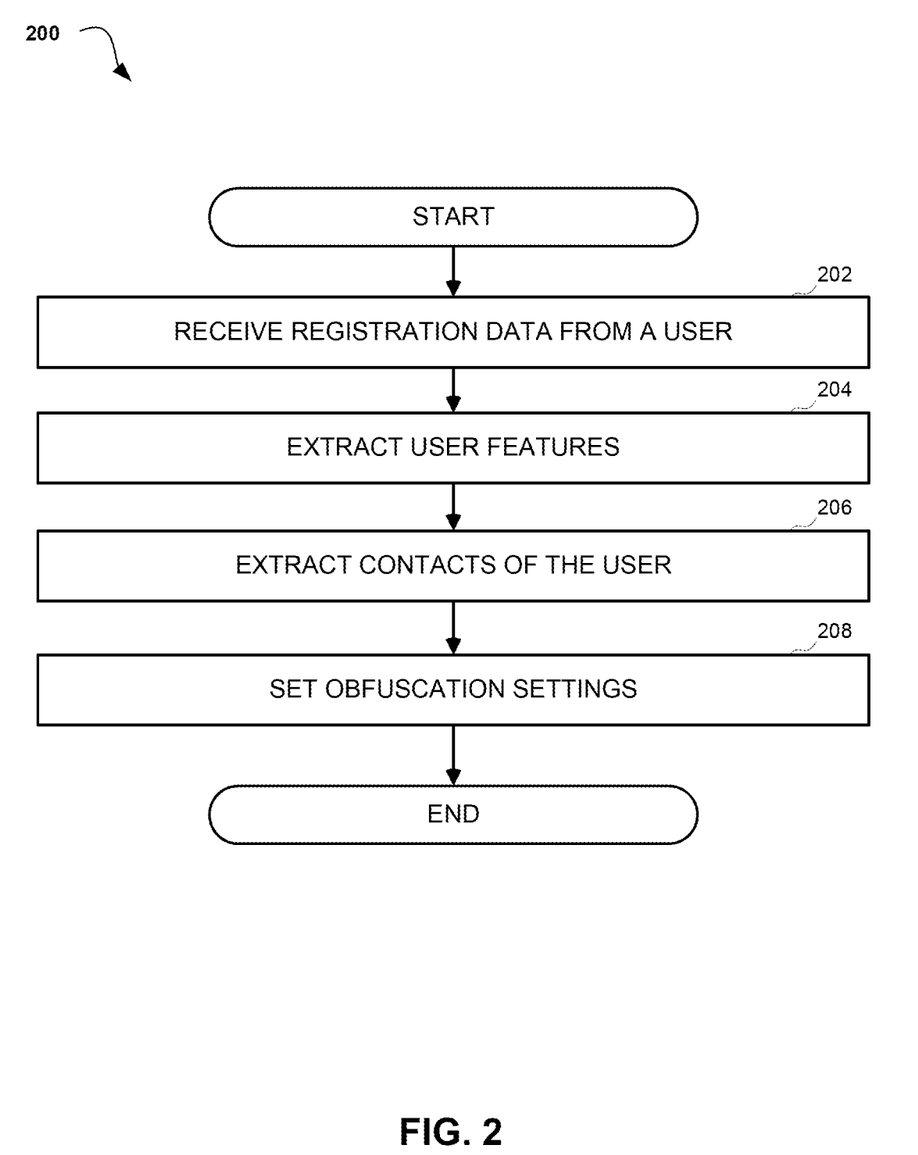
FIG. 2 is an operational flowchart illustrating an enrollment process according to at least one embodiment.

Referring now to FIG. 2, an operational flowchart illustrating an enrollment process 200 is depicted according to at least one embodiment. At 202, the VCO program 110A, 110B receives registration data from a user. According to an example embodiment, the VCO program 110A, 110B may request any user, using a graphical user interface (GUI) to opt in for the services and register as a user before allowing video conferencing. In another embodiment, any user that accidentally uses the VCO program 110A, 110B needs to opt in for the services. The VCO program 110A, 110B may request the user to enter a name, and other identifying information of a user, including social network access in order to identify coworkers and friends of the user. In another embodiment, the VCO program 110A, 110B may request a user to choose preferences for video stream obfuscation by inputting answers to questions related to an obfuscation of a video stream, such as whether the user wants only his face obfuscated or complete blocking of a camera and voice inputs. For example, the VCO program 110A, 110B may ask a user to enter whether he wants his face blurred if a video conference is with an unrecognized user or to choose a specific background when a specific user is identified.

Next, at 204, the VCO program 110A, 110B extracts user features. According to an example embodiment, the VCO program 110A, 110B may use the optical instrument 118 to capture dimensions, photographs or temperature of the user's body, such as the face of the user, and convert the received data into an array (a vector) of facial or body features that may be stored in user data 120 in order to authenticate the user. In addition, the VCO program 110A, 110B may extract user features of all of the friends and contacts of the user that the user authorized during the registration (Step 202) and store the information in user data. In another embodiment, the VCO program 110A, 110B may store photographs of a user in user data 120 and identify a user using matching algorithms that are accompanied with confidence values. The confidence value or confidence score is typically accompanied with any machine learning or artificial intelligence (AI) algorithm and represent a probability related to the confidence in each decision or determination. For example, if an AI facial, thermal or shape recognition algorithm identifies a user from a captured data such as a photograph, the identification is accompanied by a percentage, such as 97% that represents the probability that the photo is of the identified user. In further embodiments, the VCO program 110A, 110B may use 3D sensors such as a LIDAR or other laser based measuring sensor, that may capture information about the shape of the face for fast user recognition and identification. For example, a LIDAR sensor may determine a distance of an object from the client computing device 102 and thus construct a shape of the face or other parts of the body in order to identify the user.

Then at 206, the VCO program 110A, 110B extracts contacts of the user. According to an example embodiment, the VCO program 110A, 110B may, identify contacts from the services or records provided by the user and stored in user data 120, data storage device 106, and user preferences 122 in order to extract all of the contacts related to the user. For example, the contacts may be stored as a database in the client computing device 102, or extracted from the social network. In another embodiment, the VCO program 110A, 110B may access a corporate directory of the organization in order to determine that all of the existing users are coworkers of the user. In further embodiments, the VCO program 110A, 110B may assign identifier to each identified contact such as whether a contact is a family member, a coworker, or a spammer.

Next, at 208, the VCO program 110A, 110B sets obfuscation settings. According to an example embodiment, the VCO program 110A, 110B may, using a GUI, request user inputs as to how the face and voice of the user or other participants should be modified or completely blocked, in case unauthorized or unregistered participants are identified during a video conference and stores the inputs in user data 120. For example, if there are children in the background while a user is participating in the video conference, the VCO program 110A, 110B may blur all of the other faces and voices except for the user's from the video stream.

Figure 3:
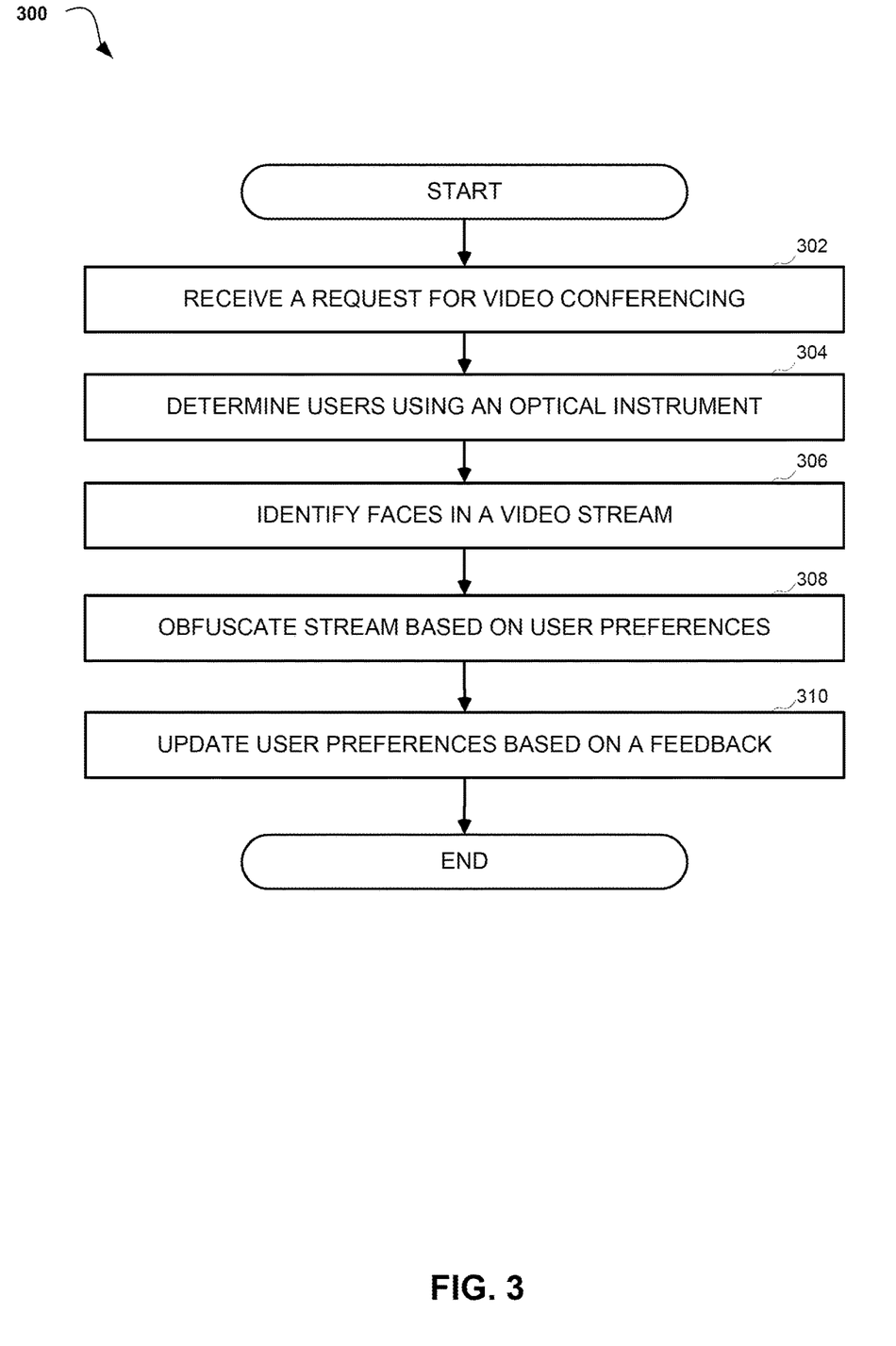
FIG. 3 is an operational flowchart illustrating a video stream obfuscation process according to at least one embodiment.

Referring now to FIG. 3, an operational flowchart illustrating a video stream obfuscation process 300 is depicted according to at least one embodiment. At 302, the VCO program 110A, 110B receives a request for video conferencing. According to an example embodiment, the VCO program 110A, 110B may determine whether there is an incoming or outgoing video conference call and intercept the video stream using an application programming interface (API) or other known technique, such as by using a bot as a participant during the video conference.

Next, at 304, the VCO program 110A, 110B determines users using an optical instrument. According to an example embodiment, the VCO program 110A, 110B may utilize the user recognition software, such as facial recognition, to identify user's face oriented towards optical instrument 118 and match the facial features vector to a user in the user data 120. In another embodiment, the VCO program 110A, 110B may identify more than one face and determine an association with the user data 120 corresponding to the face. For example, a video camera may identify a registered user facing the camera and a user in the background that is not identified in the user data 120. In another embodiment, the VCO program 110A, 110B may identified users using a shapes or thermal distribution in case the optical instrument is a thermal camera or a laser measuring sensor, such as LIDAR.

Then, at 306, the VCO program 110A, 110B identifies faces in a video stream. According to an example embodiment, the VCO program 110A, 110B may, using the facial recognition software, identify all of the faces in the video stream using vectorization of their facial features or using a known facial recognition technique in order to match the vectors extracted from the faces to the user data 120 to identify all of the participants and their relation to the user, such as whether the participants are coworkers, friends or family members. In another embodiment, the VCO program 110A, 110B may monitor all of the participants and identify them in case additional participants are joining in the middle or when one of the participants is substituted by a new participant.

Then, at 308, the VCO program 110A, 110B obfuscates the stream based on user preferences. According to an example embodiment, the VCO program 110A, 110B may blur the face of one or more users before sending the video stream to a video conferencing software. For example, user preferences may be set so that only a user's face is shown if a video conference is related to work thus, if a child appears in the background his face may be blurred by the VCO program 110A, 110B. In another embodiment, when a user chooses high confidentiality, then if any participant is not in a user's list of contacts, the unauthorized participant will not see nor hear his voice.

Next, at 310, the VCO program 110A, 110B updates user preferences based on a feedback. According to an example embodiment, the VCO program 110A, 110B may, after taking any obfuscation action, display a summary of the action to the user, using a GUI, and let the user correct the obfuscation action. Furthermore, the VCO program 110A, 110B may update user preferences based on user replies. For example, if a user received a notification that a stream to a specific participant was obfuscated, the user may chose to remove obfuscation and the VCO program 110A, 110B will update user preferences accordingly and add the specific participant as a friend to user data 120.

It may be appreciated that FIGS. 2-3 provide only an illustration of one implementation and does not imply any limitations with regard to how different embodiments may be implemented. Many modifications to the depicted environments may be made based on design and implementation requirements. In an alternate embodiment, the VCO program 110A, 110B may store a sample or a vectorized representation of a voice of each user and utilize audio recognition based on tone, speech and voice of the user. In instances, when the VCO program 110A, 110B determines that the voice of a user does not match the vectorized representation, the VCO program 110A, 110B may obfuscate all or part of the incoming video stream to that user.

Figure 4:
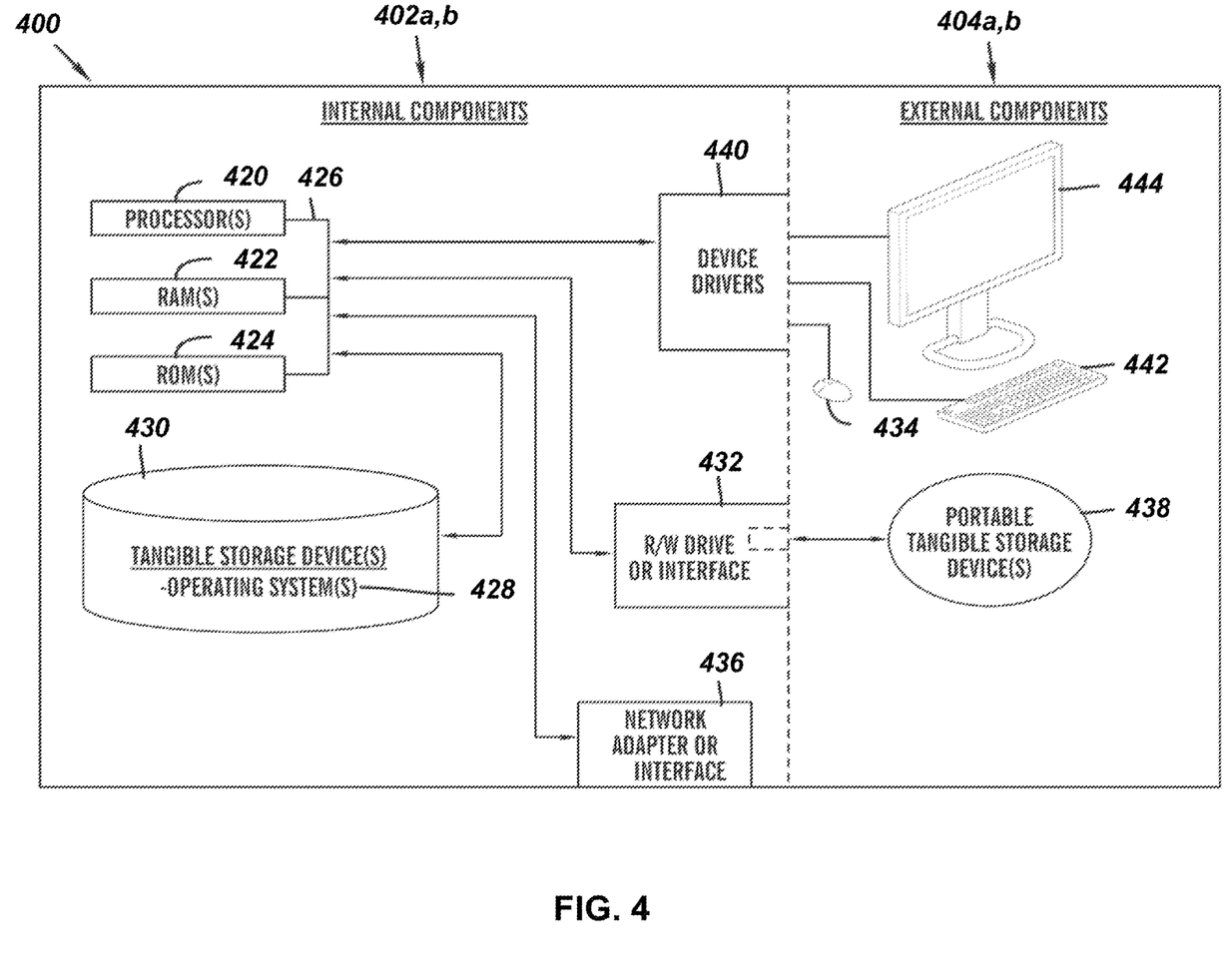
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the VCO program 110A in the client computing device 102, and the VCO program 110B in the server 112 are stored on one or more of the respective computer-readable tangible storage devices 330 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the VCO program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the VCO program 110A in the client computing device 102 and the VCO program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the VCO program 110A in the client computing device 102 and the VCO program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
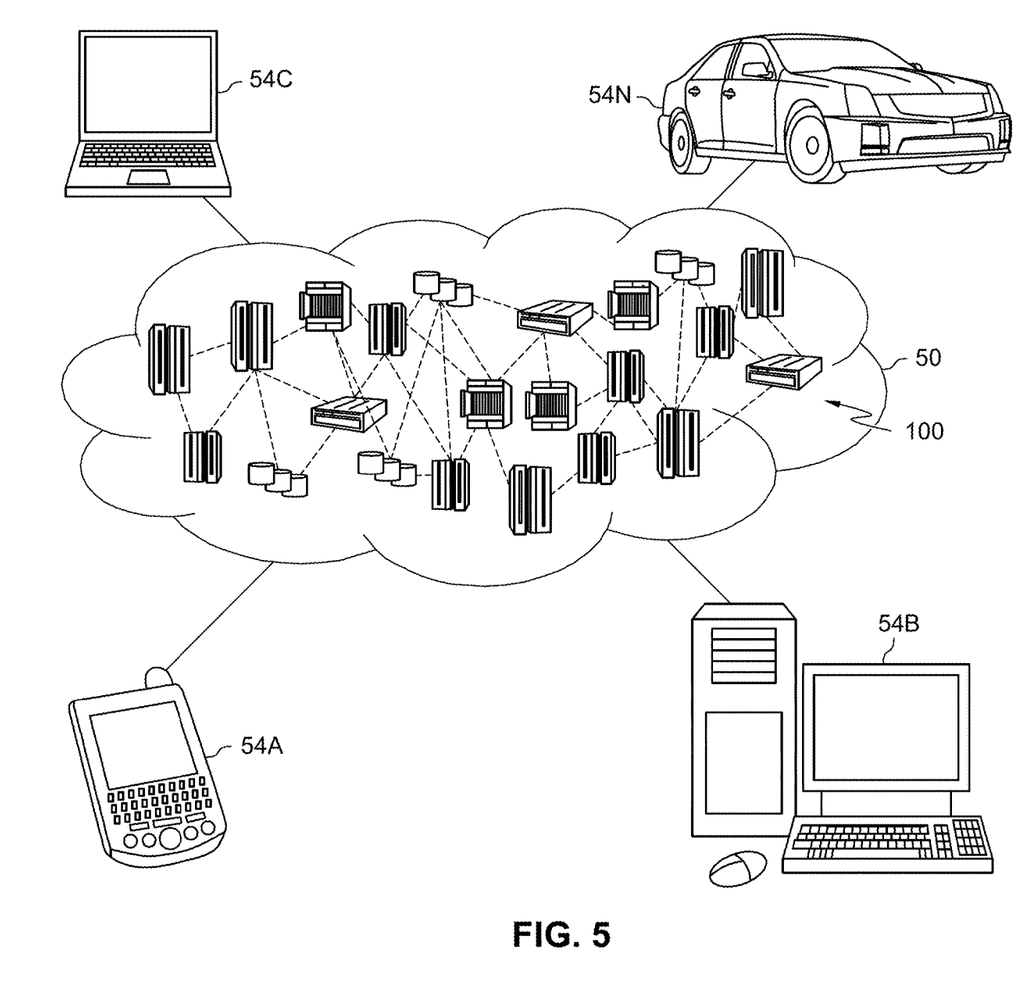
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
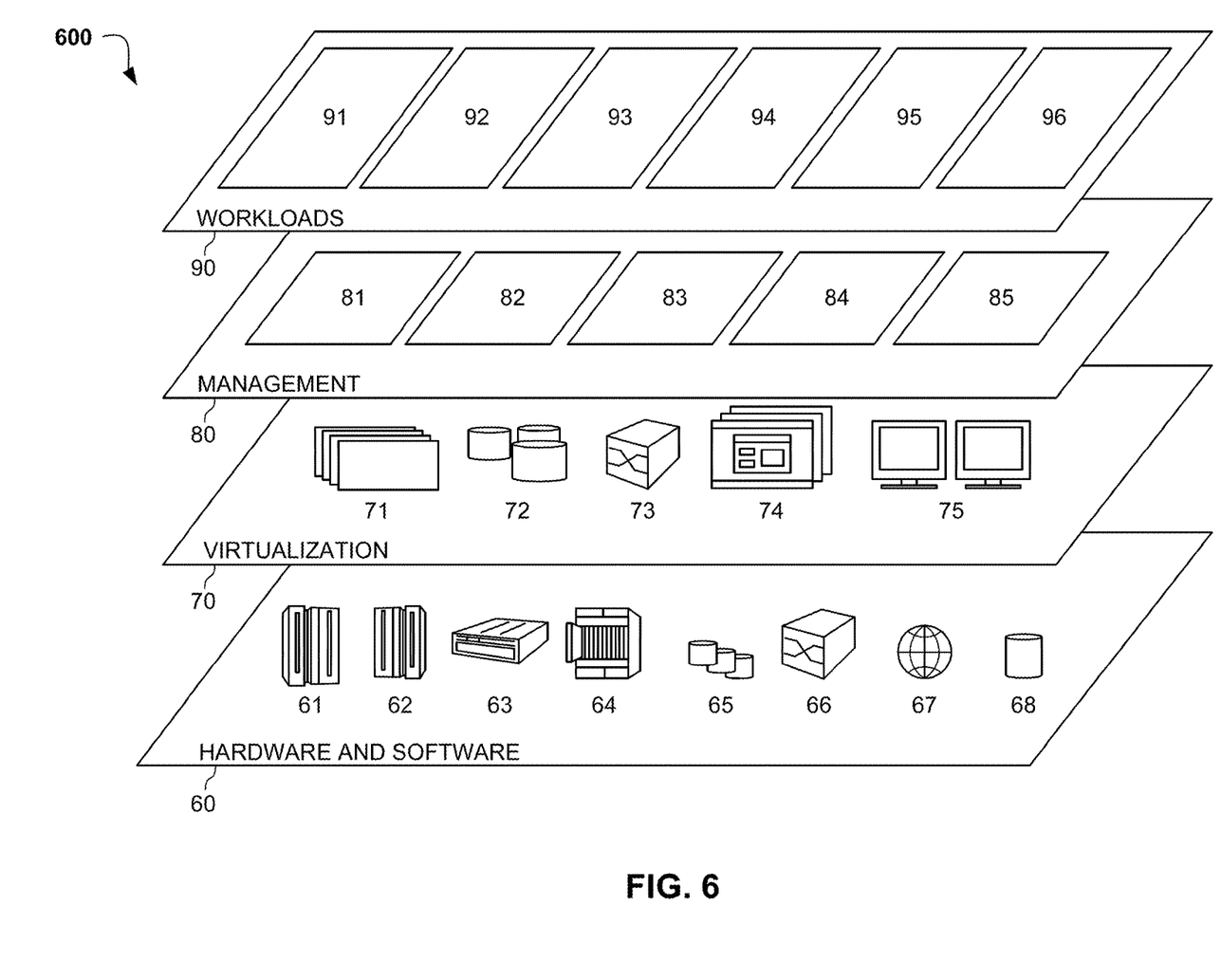
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video conference stream obfuscation 96. Video conference stream obfuscation 96 may relate to identifying faces of one or more participants and, based on user preferences, obfuscating parts of the video stream in order to comply with privacy settings and preferences of the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for video obfuscation in a video conference, the method comprising:
   receiving a video stream for the video conference;
   based on identifying a user using an optical instrument, determining user preferences associated with the user;
   identifying one or more participants, wherein the one or more participants comprises known and/or unknown individuals, from the video stream of the video conference; and
   obfuscating a part of the video stream based on the user preferences associated with the one or more participants.

2. The method of claim 1, further comprising:
   requesting a feedback from the user; and
   updating user preferences based on the feedback.

3. The method of claim 1, further comprising:
   receiving registration data from the user; and
   extracting user features of the user, using the optical instrument.

4. The method of claim 1, wherein obfuscating the part of the video stream further comprises blurring a face of the user using pixelization.

5. The method of claim 1, wherein receiving the video stream comprises using an application programming interface to determine the video stream.

6. The method of claim 1, wherein identifying the user further comprises:
   capturing a shape of the user using a LIDAR sensor.

7. The method of claim 1, wherein obfuscating the video stream comprises blocking a voice of the user.

8. A computer system for video obfuscation in a video conference, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a video stream for the video conference;
based on identifying a user using an optical instrument, determining user preferences associated with the user;
identifying one or more participants, wherein the one or more participants comprises known and/or unknown individuals, from the video stream of the video conference; and
obfuscating a part of the video stream based on the user preferences associated with the one or more participants.

9. The computer system of claim 8, further comprising:
requesting a feedback from the user; and
updating user preferences based on the feedback.

10. The computer system of claim 8, further comprising:
receiving registration data from the user; and
extracting user features of the user, using the optical instrument.

11. The computer system of claim 8, wherein obfuscating the part of the video stream further comprises blurring a face of the user using pixelization.

12. The computer system of claim 8, wherein receiving the video stream comprises using an application programming interface to determine the video stream.

13. The computer system of claim 8, wherein identifying a face of the user further comprises:
capturing a shape of the user using a LIDAR sensor.

14. The computer system of claim 8, wherein obfuscating the video stream comprises blocking a voice of the user.

15. A computer program product for video obfuscation in a video conference, the computer program product comprising:
one or more computer-readable tangible storage medium and program instructions stored on at least one of the one or more tangible storage medium, the program instructions executable by a processor, the program instructions comprising:
program instructions to receive a video stream for the video conference;
based on identifying a user using an optical instrument, program instructions to determine user preferences associated with the user;
program instructions to identify one or more participants, wherein the one or more participants comprises known and/or unknown individuals, from the video stream of the video conference; and
program instructions to obfuscate a part of the video stream based on the user preferences associated with the one or more participants.

16. The computer program product of claim 15, further comprising:
program instructions to request a feedback from the user; and
program instructions to update user preferences based on the feedback.

17. The computer program product of claim 15, further comprising:
program instructions to receive registration data from the user; and
program instructions to extract user features of the user, using the optical instrument.

18. The computer program product of claim 15, wherein program instructions to obfuscate the part of the video stream further comprises blurring a face of the user using pixelization.

19. The computer program product of claim 15, wherein program instructions to receive the video stream comprises program instructions to use an application programming interface to determine the video stream.

20. The computer program product of claim 15, wherein program instructions to identify a face of the user further comprises:
capturing a shape of the user using a LIDAR sensor.

* * * * *